United States Patent
Kanto et al.

(10) Patent No.: US 12,236,578 B2
(45) Date of Patent: Feb. 25, 2025

(54) INFORMATION PROCESSING DEVICE AND SYSTEM DISPLAYING INFORMATION IN TIME-SERIES ORDER ON CHIPS IN REGIONS OF IMAGE CAPTURED INSIDE MACHINE TOOL

(71) Applicant: DMG MORI CO., LTD., Nara (JP)

(72) Inventors: Kenta Kanto, Nara (JP); Masakazu Takayama, Nara (JP); Keisuke Yanagihara, Nara (JP)

(73) Assignee: DMG MORI CO., LTD., Nara (JP)

( * ) Notice: Subject to any disclaimer, the term of this patent is extended or adjusted under 35 U.S.C. 154(b) by 373 days.

(21) Appl. No.: 17/783,487

(22) PCT Filed: Dec. 8, 2020

(86) PCT No.: PCT/JP2020/045741
§ 371 (c)(1),
(2) Date: Jun. 8, 2022

(87) PCT Pub. No.: WO2021/117745
PCT Pub. Date: Jun. 17, 2021

(65) Prior Publication Data
US 2023/0011866 A1    Jan. 12, 2023

(30) Foreign Application Priority Data
Dec. 9, 2019 (JP) .................................. 2019-222208

(51) Int. Cl.
*G06T 7/00* (2017.01)
*B23Q 11/00* (2006.01)
(Continued)

(52) U.S. Cl.
CPC .......... *G06T 7/001* (2013.01); *B23Q 11/0042* (2013.01); *B23Q 17/24* (2013.01);
(Continued)

(58) Field of Classification Search
CPC ......... G06T 7/0004; G06T 7/001; G06T 7/11; G06T 2207/20021; G06T 2207/30108;
(Continued)

(56) References Cited

U.S. PATENT DOCUMENTS 10,201,839 B2 *  2/2019 Takikawa ............ B23Q 11/005
11,207,754 B2 * 12/2021 Tanaka ............... B23Q 11/0042
(Continued)

FOREIGN PATENT DOCUMENTS

JP    2007293547 A    11/2007
JP    2008-155324 A    7/2008
(Continued)

OTHER PUBLICATIONS

International Search Report, PCT/JP2020/045741, dated Feb. 22, 2021, 3 pages.
(Continued)

*Primary Examiner* — Scott A Rogers
(74) *Attorney, Agent, or Firm* — Stinson LLP

(57) ABSTRACT

An information processing device according to the present disclosure including: a mesh division unit (102) that divides at least part of first and second images captured at different times of a target area for detecting chips generated from a workpiece, into a plurality of mesh regions, the images each being an inside image of a machine tool; and an information processing unit (103) that performs processing to associate (a) information on a first chip corresponding to a specific mesh region among the plurality of the mesh regions corresponding to the first image, (b) information on a second chip corresponding to the specific mesh region among the plurality of the mesh regions corresponding to the second image, (c) a first time related to the first image, and (d) a second time related to the second image.

14 Claims, 10 Drawing Sheets

(51) Int. Cl.
*B23Q 17/24* (2006.01)
*G05B 19/4065* (2006.01)
*G06T 7/11* (2017.01)

(52) U.S. Cl.
CPC ............ *G05B 19/4065* (2013.01); *G06T 7/11* (2017.01); *B23Q 17/2452* (2013.01); *G05B 2219/35111* (2013.01); *G06T 2207/20021* (2013.01); *G06T 2207/30164* (2013.01)

(58) Field of Classification Search
CPC .......... G06T 2207/30164; B23Q 17/24; B23Q 17/2452; B23Q 11/0042; G05B 19/4065; G05B 2219/35111
See application file for complete search history.

(56) References Cited

U.S. PATENT DOCUMENTS

| | | | |
|---|---|---|---|
| 11,657,490 B2* | 5/2023 | Isobe | G05B 23/024 382/141 |
| 2007/0064101 A1 | 3/2007 | Hasegawa et al. | |
| 2011/0319711 A1 | 12/2011 | Yamaguchi et al. | |
| 2016/0184947 A1 | 6/2016 | Itou | |
| 2017/0043442 A1* | 2/2017 | Takikawa | B05B 15/60 |
| 2017/0144262 A1 | 5/2017 | Okuda | |
| 2018/0147645 A1 | 5/2018 | Boccadoro et al. | |
| 2019/0196439 A1 | 6/2019 | Sugita et al. | |
| 2019/0196454 A1 | 6/2019 | Tarui | |
| 2019/0369592 A1 | 12/2019 | Oonishi | |
| 2021/0138660 A1* | 5/2021 | Miyawaki | B23Q 17/20 |
| 2021/0142458 A1* | 5/2021 | Miyawaki | G06V 10/56 |
| 2022/0237767 A1* | 7/2022 | Okuno | B23Q 11/0042 |
| 2023/0019148 A1* | 1/2023 | Kubota | B08B 3/024 |
| 2023/0043666 A1* | 2/2023 | Inoue | B23Q 17/249 |
| 2023/0049354 A1* | 2/2023 | Okuno | B23Q 17/2433 |
| 2023/0076772 A1* | 3/2023 | Kanto | G06T 17/20 |
| 2023/0376002 A1* | 11/2023 | Ogawa | G16Y 10/25 |
| 2024/0087158 A1* | 3/2024 | Koda | G06T 7/62 |
| 2024/0241496 A1* | 7/2024 | Koda | G05B 19/29 |

FOREIGN PATENT DOCUMENTS

| | | |
|---|---|---|
| JP | 2010-035756 A | 2/2010 |
| JP | 201035756 A | 2/2010 |
| JP | 2011-092677 A | 5/2011 |
| JP | 2012-245395 A | 12/2012 |
| JP | 2015-130698 A | 7/2015 |
| JP | 2018-024094 A | 2/2018 |
| JP | 201824094 A | 2/2018 |

OTHER PUBLICATIONS

Written Opinion, PCT/JP2020/045741, dated Feb. 22, 2021, 4 pages.
Japanese Office Action issued in the corresponding Japanese Patent Application No. 2021-563987, mailed Feb. 15, 2022, and its English Machine Translation.

* cited by examiner

| IMAGE ID | I1 | I2 | I3 | I4 | I5 | I6 | I7 |
|---|---|---|---|---|---|---|---|
| TIME ID | T1 | T2 | T3 | T4 | T5 | T6 | T7 |
| A1 | 0 | 0 | 0 | 0 | 0 | 0 | 0 |
| A2 | 0 | 0 | 0 | 1 | 1 | 1 | 1 |
| A3 | 2 | 2 | 2 | 2 | 2 | 2 | 0 |
| A4 | 2 | 3 | 3 | 4 | 5 | 0 | 1 |
| A5 | 3 | 4 | 4 | 5 | 0 | 1 | 1 |
| A6 | 4 | 4 | 5 | 0 | 0 | 1 | 2 |
| ... | ... | ... | ... | ... | ... | ... | ... |

113 HISTORY DATA — IDENTIFICATION LEVEL (REGION ID)

A147

INFORMATION PROCESSING DEVICE AND SYSTEM DISPLAYING INFORMATION IN TIME-SERIES ORDER ON CHIPS IN REGIONS OF IMAGE CAPTURED INSIDE MACHINE TOOL

REFERENCE TO RELATED APPLICATIONS

This application is the 371 U.S. national stage application of International Patent Application No. PCT/JP2020/045741, filed Dec. 8, 2020, which claims the benefit of Japanese Patent Application No. 2019-222208, filed Dec. 9, 2019, the entire disclosures of which are incorporated herein by reference.

TECHNICAL FIELD

The present invention relates to an information processing device, a machine tool, and an information processing system.

BACKGROUND ART

Machining a workpiece, which is a machining object, in a machine tool generates chips. As the chips accumulate and build up, the machining becomes difficult to continue. In the machine tool, therefore, it has been necessary to remove the chips generated by machining. Patent Literature 1 discloses a technique for performing automatic cleaning when the integrated value or the number of times of machining of a workpiece reaches a predetermined value. Patent Literature 2 discloses a technique for detecting the accumulation condition of powdery chips inside the machine and cleaning the place where the chip removal is determined to be necessary.

CITATION LIST

Patent Literature

[PTL 1] Japanese Laid-Open Pat Publication No. 2008-155324
[PTL 2] Japanese Laid-Open Pat Publication No. 2016-120589

SUMMARY OF INVENTION

Technical Problem

However, even when the machining time is short, and the number of times of machining is small, it could occur that a large amount of chips accumulate, depending on the place. Even if the amount of accumulated chips is small, due to the small amount, it could occur that the cleaning operation is not performed over a long period of time, and the chips rather continue to build up. If this occurs, the chips may clot and become difficult to remove. In order to address these inconveniences, it is preferable, in some cases, to make it possible to grasp the accumulation condition of the chips over time.

Solution to Problem

An information processing device according to the present disclosure includes: a mesh division unit (102) that divides at least part of first and second images captured at different times of a target area for detecting chips generated from a workpiece, into a plurality of mesh regions, the images each being an inside image of a machine tool; and an information processing unit (103) that performs processing to associate (a) information on a first chip corresponding to a specific mesh region among the plurality of the mesh regions corresponding to the first image, (b) information on a second chip corresponding to the specific mesh region among the plurality of the mesh regions corresponding to the second image, (c) a first time related to the first image, and (d) a second time related to the second image.

The present disclosure can also provide a machine tool and an information processing system.

These comprehensive and specific aspects may be realized by a system, a method, a computer program, and a combination thereof.

Advantageous Effects of Invention

According to the present invention, it is possible to grasp the chip accumulation over time.

DESCRIPTION OF EMBODIMENTS

Figure 1:
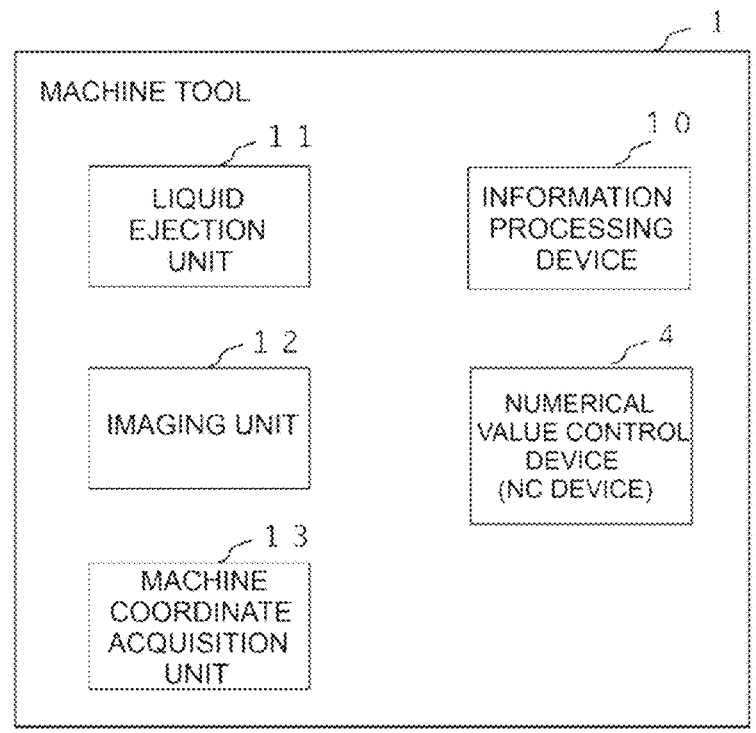
FIG. 1 A block diagram showing a configuration of a machine tool according to Embodiment 1.

Description will be given below of an information processing device, a machine tool, and an information processing system according to each embodiment, with reference to the drawings. In the following description, the same elements are denoted by the same reference numerals, and description thereof is omitted.

The "machine tool" described below is for machining a workpiece such as a metal, which is a machining object, into a desired shape by cutting, grinding, and the like. The "information processing device" and the "information processing system" are for managing time-series changes in the accumulation of chips generated during machining of the workpiece in the machine tool.

In the following description, a "target area" means an image capture area to be imaged by an imaging unit, in the machine tool.

A "mesh region" means a part of region of an image obtained by segmenting image data.

A "predetermined position" means a specific position in the machine tool, and specifically, is a position specified by three-dimensional coordinates. A "predetermined position in the image" means a position within a space to be imaged. From three-dimensional coordinate information, an image taken from a different direction, and the like of a known member shown in the image, the three-dimensional coordinates of an image capture area to be imaged by the imaging unit and the two-dimensional coordinates of the captured image are correlated to each other in advance. And then, based on the coordinates of the mesh region (predetermined position in the image), the corresponding predetermined position in the three-dimensional coordinates in the machine tool is specified. That is, the coordinates of the mesh region are associated with the coordinates of the X-axis, the Y-axis, and the Z-axis in the machine tool. The coordinates in the machine tool are determined by a coordinate system (X, Y, and Z-axes), with the Z-axis direction being the main shaft direction.

The "determined value" is determined for each mesh region or for each predetermined region including a plurality of mesh regions. Hereinafter, a predetermined region including a plurality of mesh regions is sometimes referred to as a "mesh region group." The mesh region group may be composed of a plurality of mesh regions specified so as to be connected to each other. The number of mesh regions constituting the mesh region group is, for example, two or more, and may be three or more, or may be four or more. The "determined value" means a value representing the amount of accumulated chips at a predetermined position corresponding to one of the mesh regions or the mesh region group. A mesh region or a mesh region group for which the determined value is output may be designated by an input signal input by the operator via an input unit 120.

Embodiment 1

<Machine Tool>

An example of a machine tool 1 according to Embodiment 1 will be described with reference to FIG. 1. The machine tool 1 is for machining a workpiece, which is a machining object. As the workpiece is machined, part of the workpiece is separated to generate chips, which build up in the machine tool 1. For example, the machine tool 1 includes a numerical value control device 4 that performs driving control of the main shaft for machining, a liquid ejection unit 11 that ejects a liquid for moving chips generated by machining; an imaging unit 12 that captures an image of the inside of the machine tool 1, a machine coordinate acquisition unit 13; and an information processing device 10 that manages time-series changes in the accumulation of chips generated by machining.

A liquid ejection unit 11 ejects a liquid, in order to move the chips accumulated inside the machine tool 1, in accordance with the control by the numerical value control device 4. The machine tool 1 can collect the chips having moved in this way and discharge the chips to the outside of a machining region (a region inside the machine tool 1 defined as a region where chips are scattered). The liquid ejection unit 11 includes, for example, a nozzle capable of ejecting a liquid, an actuator for driving the nozzle, and a pump for pumping up a liquid from a liquid reservoir in which a liquid is stored, and ejects a liquid from the nozzle to the chips. The liquid may be a coolant for cooling and lubricating the workpiece and machining means, etc. that generate heat during machining, but not limited thereto, and other liquids may be used. In the following, the description is given provided that the liquid for moving chips is a coolant. In order to make it possible to clean a wide area of the inside of the machine tool 1, the liquid ejection unit 11 is configured in such a way that, for example, the nozzle position and orientation and the coolant ejection pressure are adjustable. The machine tool 1 may include a plurality of the liquid ejection units 11.

The imaging unit 12 is, for example, a camera equipped with an imaging element, such as a CCD or a CMOS. The imaging unit 12 is placed in the machining region in the machine tool 1. The imaging unit 12 is fixed, for example, at an upper portion in the machine tool 1. Desirably, the imaging unit 12 (camera) placed in the machining region is fixed at such an angle of view that the image of at least part of horizontal surfaces and at least part of side surfaces defining the machining region can be captured by one shot. The imaging unit 12 placed in the machining region may be fixed and placed at such an angle of view that the image of the horizontal surfaces and the side surfaces which entirely include the machining region, including the surface of a table on which the workpiece is placed, can be captured by one shot. The imaging unit 12 can capture an image of the inside of the machine tool 1 at a predetermined timing. The imaging unit 12 captures an internal image of the machine tool 1, within a target area for detecting chips generated from a workpiece. The imaging unit 12 outputs the obtained image data to the information processing device 10. For example, the imaging unit 12 captures an image at a regular timing during the machining of a workpiece. The regular timing during the machining of a workpiece is desirably selected from during cutting of the workpiece within which the machine tool 1 is operating, that is, from within the workpiece machining period in which chips are generated from the workpiece. During the workpiece machining period, chips are constantly generated from the workpiece. By configuring such that an image of the inside of the machine tool 1 is captured by the imaging unit 12 at a predetermined timing within the machining period in which chips are constantly generated from the workpiece, it is possible to exclude information during the time window in which no chips are generated, i.e., information before starting and after the machining of the workpiece, from the information on chips processed by the information processing device 10. Therefore, the user, such as the operator, can more accurately grasp the chip accumulation over time. The workpiece machining period can be referred to as a period in which the machine tool 1 is in operation, and the inside of the machine tool 1 (a machining region defined as an area where chips are scattered) is not open. In this time window, chips are constantly generated from the workpiece, except for a short period of time taken for, for example, tool replacement. The timing at which the inside of the machine tool 1 is opened corresponds to a timing at which a revolving door 17 as described later turns, or a timing at which a side surface 18 is opened, and includes a timing before starting and after the machining of the workpiece. The imaging unit 12 may be configured to capture an image after the machining of the workpiece, for example, at the timing when the processed workpiece is removed from the machine tool 1, or before the machining of the workpiece, for example, at the timing when a new workpiece is placed. The machine tool 1 can include a plurality of the imaging units 12, so that the condition over a wide range can be grasped.

Figure 2:
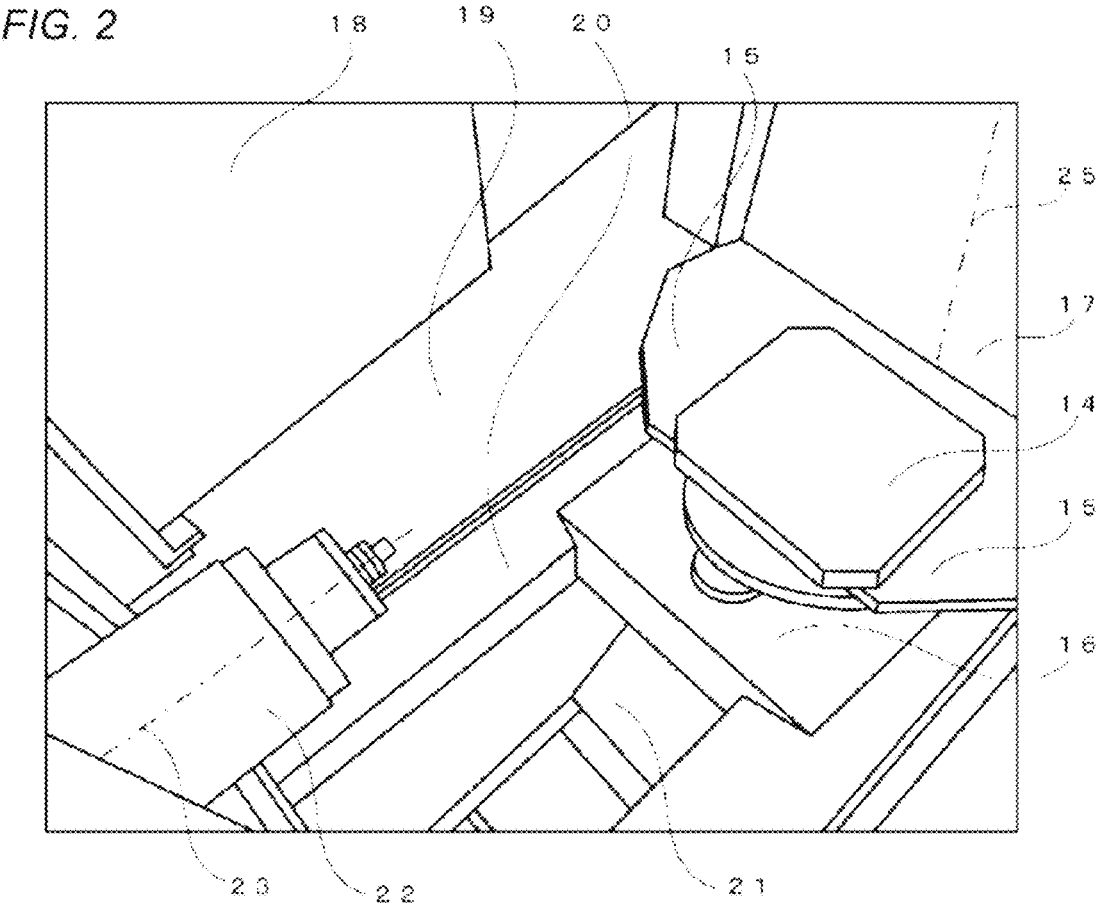
FIG. 2 A captured image of the inside of the machine tool according to Embodiment 1.

With respect to movable components included in the machine tool 1, such as a pallet 14, a table 16, and a main shaft 22, as described later by referring to FIG. 2, the machine coordinate acquisition unit 13 acquires machine coordinates that represent a position of the component in the machine tool 1. The machine coordinate acquisition unit 13 transmits the acquired machine coordinates to the information processing device 10. The machine coordinates may be, for example, position information transmitted from the numerical value control device to the machine tool 1 for machining, or may be acquired using a some kind of sensor.

Figure 3:
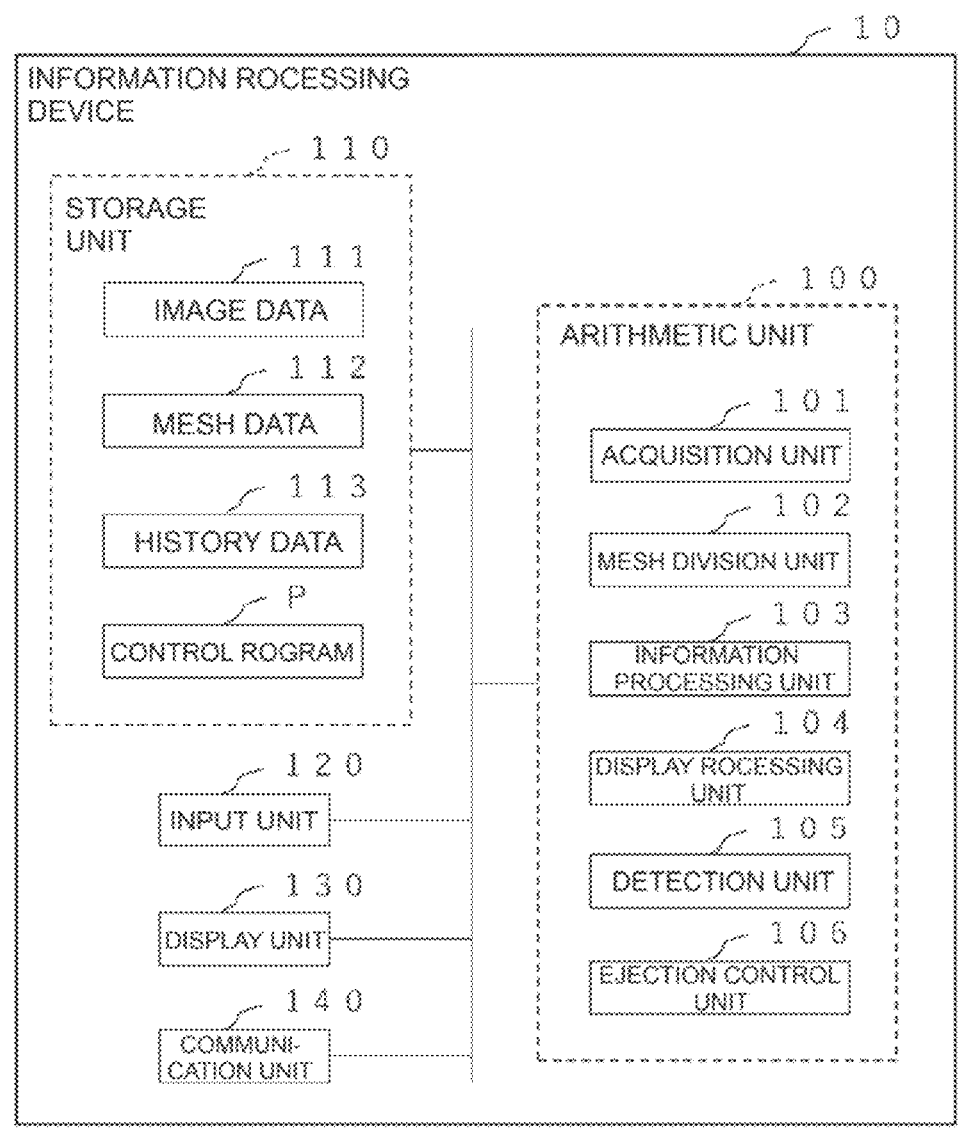
FIG. 3 A block diagram showing a configuration of an information processing device according to Embodiment 1.

The information processing device 10 will be described later with reference to FIG. 3. Although not shown in FIG. 1, the machine tool 1 further includes various components as described with reference to FIG. 2. FIG. 2 shows a captured image of the inside of the machine tool 1, in which the pallet 14, the cover 15, the table 16, the revolving door 17, the side surface 18, a sloped surface 19, a protector 20, a chute 21, and the main shaft 22 are shown. In the present embodiment, with a longitudinal axis 23 of the main shaft 22 shown in FIG. 2 taken as the front and rear directions inside the machine tool 1, the root end side of the main shaft 22 is referred to as the front side, and the tip end side thereof is referred to as the rear side. The horizontal direction orthogonal to the main shaft 22 is referred to as the right and left directions, and the vertical direction orthogonal to the longitudinal axis 23 is referred to as the up and down directions.

The pallet 14 is a table on which the workpiece is placed and secured. The machine tool 1 can include a plurality of pallets 14. In this case, when changing the workpiece to be machined, the workpiece can be changed by replacing the pallet 14, which is time effective.

The cover 15 is a component situated on the right and left sides of the pallet 14. The table 16 is movable in the front and rear directions, and thus, the workpiece secured on the pallet 14 can be moved. The table is configured such that a least part of the table is rotatable in the horizontal direction, so that the workpiece secured on the pallet can be rotated.

The table 16 is a component to which the pallet 14 can be attached. The table 16 is movable in the front and rear directions, and thus, the workpiece secured on the pallet 14 can be moved. The table 16 is configured such that a least part of the table 16 is rotatable in the horizontal direction, so that the workpiece secured on the pallet 14 can be rotated.

The revolving door 17 can revolve about an axis 25. When revolving, the cover 15 separates the pallet 14 from the table 16, and the revolving door 17 revolves together with the pallet 14 and the cover 15. In this way, the pallet 14 with the machined workpiece thereon can be unloaded into a pallet stocker, and another pallet 14 with a workpiece to be processed next secured thereon can be loaded into the machine tool 1 from the pallet stocker. The cover 15 may be attached to the revolving door 17 both on the inner side of the machine tool 1 and on the stocker side, so that the unloading and loading of the pallet 14 can be done simultaneously when the revolving door 17 revolves by 180 degrees.

The side surface 18 is an openable and closable wall of the machine tool 1. The side surface 18 defines the inside and the outside of the machine tool 1, and when the side surface 18 is open, the operator can enter the inside of the machine tool 1. Another side surface 18 (not shown) at a position facing the side surface 18 defines the inside of the machine tool 1 and a tool stocker. The tool stocker stores a plurality of tools, and during the machining, the side surface 18 opens as necessary, so that the tool attached to the main shaft 22 can be replaced with another tool stored in the tool stocker.

The chute 21 is a place into which the chips flow by cleaning. The sloped surface 19 and the protector 20 are provided below the revolving door 17 and the side surface 18, and are each inclined toward the chute 21, so that the chips can easily flow into the chute 21.

With a tool attached to its tip, the main shaft 22 is rotated about the longitudinal axis 23 thereof, by which the workpiece can be machined. In the present embodiment, as shown in FIG. 2, the main shaft 22 has a cylindrical outer shape.

<Information Processing Device>

An example of the information processing device 10 according to the embodiment will be described with reference to FIG. 3. The information processing device 10 includes an arithmetic unit 100, a storage unit 110, an input unit 120, a display unit 130, and a communication unit 140. The information processing device 10 is, for example, an information processing device, such as a computer or a tablet terminal. As shown in FIG. 1, the information processing device 10 may be included in the machine tool 1, but not limited thereto. The information processing device 10 may be a separate machine from the machine tool 1, and configured to be capable of wired or wireless communication. Furthermore, as shown in FIG. 3, the input unit 120 and the display unit 130 may be included in the information processing device 10, but not limited thereto. The input unit 120 and the display unit 130 may be provided, for example, at an operation panel of the machine tool 1. The input unit 120 and the display unit 130 may be both included in each of the information processing device 10 and the machine tool 1, so that the operator can select and use any of the input units 120 and the display units 130.

The arithmetic unit 100 is a controller that controls the entire information processing device 10. For example, the arithmetic unit 100 reads and executes a control program P stored in the storage unit 110, thereby performing processing as an acquisition unit 101, a mesh division unit 102, an information processing unit 103, a display processing unit 104, a detection unit 105, and an ejection control unit 106. The arithmetic unit 100 is not limited to those that realize a predetermined function by collaboration of hardware and software, and may be a hardware circuit specifically designed to realize a predetermined function. That is, the arithmetic unit 100 can be realized by various processors, such as a CPU, an MPU, a GPU, an FPGA, a DSP, and an ASIC.

The storage unit 110 is a recording medium that record-s various information. The storage unit 110 is realized by, for example, a RAM, a ROM, a flash memory, an SSD (Solid State Device), a hard disk, and other storage devices, either singly or in combination. The storage unit 110 can store, in addition to the control program P to be executed by the arithmetic unit 100, various data and the like to be used by the machine tool 1. For example, the storage unit 110 stores an image data 111, a mesh data 112, and a history data 113.

The input unit 120 is an input means used for inputting data and operation signals, such as a keyboard, a mouse, and a touch screen. The display unit 130 is an output means used for outputting data, such as a monitor.

The communication unit 140 is an interface circuit (module) for enabling data communication with an external device (not shown). For example, the communication unit 140 can execute data communication with the imaging unit 12 that captures image data.

The acquisition unit 101 acquires the image data captured by the imaging unit 12. The acquired image data 111 acquired by the acquisition unit 101 is stored, together with identification information attached thereto as necessary and information for specifying the time of imaging, in the storage unit 110. Therefore, the storage unit 110 can store a plurality of the image data 111 of the same target area which have been captured at different times. For example, in the following, with regard to the image data obtained by imaging the same target area, the image data 111 captured earlier is referred to as a "first image data", and the image data 111 captured after the first image data is referred to as a "second image date." Furthermore, for example, the timing at which the first image data is captured is referred to as a "first time", and the timing at which the second image data is captured is referred to as a "second time." In the following, the "image data" acquired by the acquisition unit 101 is referred to, as needed, as a "whole image data."

Figure 4A:
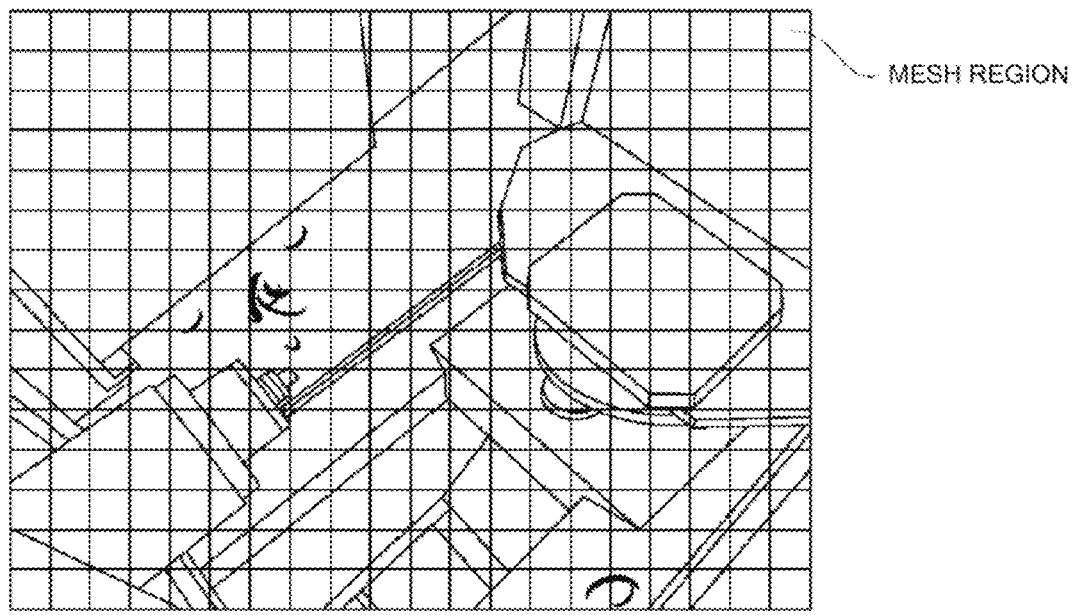
FIG. 4A A mesh image data generated by the information processing device.

The mesh division unit 102 divides at least part of each of the image data 111 stored in the storage unit 110 into a plurality of mesh regions. For example, when the image data 111 of the inside of the machine tool 1 as shown in FIG. 2 is acquired, the image data 111 is divided into a plurality of mesh regions as shown in FIG. 4A. The mesh division unit 102 divides each of the image data 111 stored in the storage unit 110 into mesh regions. An image data of each of the mesh regions is associated with the identification information of the mesh region, and stored as the mesh data 112 in the storage unit 110. In the following, in order to make distinction from the "whole image data", the image data divided into mesh regions is referred to, as needed, as a "mesh image data." FIG. 4A shows an example in which the image data 111 is entirely divided into mesh regions, but not limited thereto. Specifically, the mesh division unit 102 may set mesh regions only for a part of region of the whole image data 111. The size and shape of the mesh to be divided may be configured to be changeable, as needed. The mesh image data in the present specification is not limited to a new image created by adding information of the mesh to the captured image, and may be the capture image associated with the mesh. That is, a combination of the captured image and the mesh which are stored as separate data is also referred to as a mesh image data. The mesh division unit 102 may have a function of dividing at least part of a current real-time captured image of the inside of the machine tool, into a plurality of mesh regions.

The information processing unit 103 associates "information for specifying the time of imaging of the image data 111" and "information on chips", with each mesh region formed by dividing by the mesh division unit 102. Specifically, information for specifying the time and information on chips are associated with the identification information of the mesh region. These information associated with each other by the processing unit 103 are stored as the history data 113 in the storage unit 110.

The "information on chips" includes, for example, determined values regarding the shape, size and type of the chips, and the amount of accumulated chips. In the following, description is given using a determined value representing the amount of chips accumulated in the mesh region specified from the image data, as the "information on chips." The determined value representing the amount of chips can be the weight or volume of the accumulated chips, or can be the identification level determined by classifying the amount of chips into several levels. In the following, description is given provided that the "information on chips" is the "identification level" set according to the amount of chips. The determined value may be a determined value representing the amount of chips accumulated in one mesh region, and may be a total amount of chips accumulated in the mesh region group constituted of a plurality of mesh regions, or an average amount of the chips. The average amount of the chips can be obtained, for example, by dividing the total amount of the chips by the number of mesh regions constituting the mesh region group.

Specifically, the information processing unit 103 recognizes the chips from the mesh image data, and specifies the presence or absence of the chips in each mesh region or the mesh region group, and the amount of chips present therein. For example, the information processing unit 103 can identify the amount of chips present at a predetermined position corresponding to each mesh region or the mesh region group in the mesh image data, using a learned model obtained by machine-learning in advance by a learning machine. Here, the information processing unit 103 specifies a value set according to the amount of the identified chips as the "identification level." In the following, when the value of the "identification level" is small, the amount of chips in the target area is regarded as small. As the amount of chips increase, the value of the "identification level" becomes higher. Specifically, for example, the value is set to "0" when there are no chips. With increase in the amount of chips, the value increases. When there are such a large amount of chips that need to be moved, the value is set to "5." The determined value or the identification level may be set by color, rather than by the numerical value. For example, when the amount of chips in the target area is large, "red" is set as the identification level. When the amount of chips is small, "yellow" is set. When there are no chips, no color is set. Such an image may be, for example, displayed on the display unit 130 by superimposing a color pattern output by the information processing unit 103, on the mesh image data.

The "time related to the image data" is information for specifying the time of imaging of the image data. The "time related to the image data" is not limited to the actual imaging time, and may be anything that can distinguish between the time when the image data in the past is captured and the time when the image data to be processed is captured, and can specify the interval therebetween. Therefore, for example, with the first time related to the first image set to '0', when the second image is acquired '5 minutes after' the acquisition of the first image, the second time may be set to '5.' Also, for example, in the case where the interval of the image data acquisition is fixed, with the first time related to the first image set to '1', given that the second image is acquired '5 minutes after' from the acquisition of the first image, the second time may be set to '2.'

In this way, the information processing unit 103 can perform processing to associate (a) information on the first chips in the plurality of mesh regions of the first image data, (b) information on the second chips in the plurality of mesh regions of the second image data, (c) the first time related to the first image data, and (d) the second time related to the second image data.

At this time, the information processing unit 103 may associate information on chips corresponding to a specific mesh region, rather than associating information on chips in all mesh regions. The "specific mesh region" is, for example, a preset region. Specifically, a region where chips are likely to accumulate can be defined in advance as a specific mesh region.

Figures 5, 6:
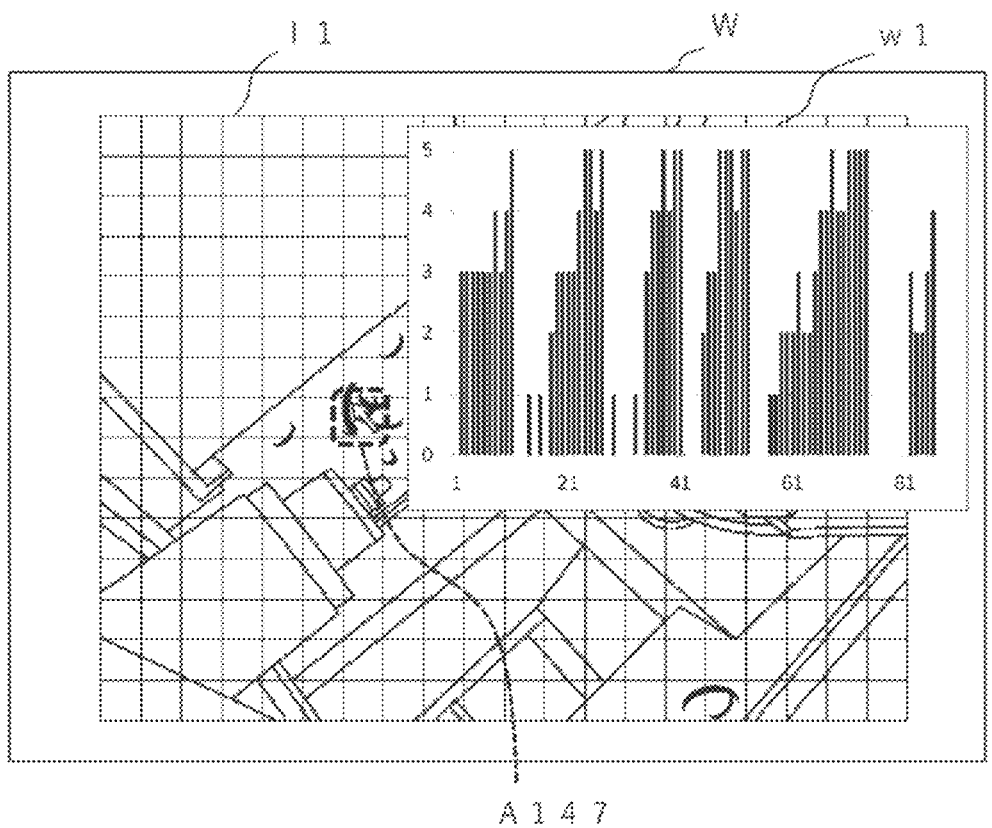
FIG. 5 A data configuration diagram showing history data generated by the information processing device.
FIG. 6 An example of time-series information displayed on the information processing device.

FIG. 5 shows an example of the history data 113 generated by the information processing unit 103. In an example of the history data 113 shown in FIG. 5, an 'image ID' that identifies the image data 111 and a 'region ID' that identifies the mesh region are associated with an 'identification level' which is the "information on chips" of each mesh region. In the example shown in FIG. 5, each 'image ID' is associated with a 'time ID' that identifies the imaging time as the time related to the image data 111. In the example of the history data 113, the image data 111 of the image ID "I1" is regarded as having been acquired before the image data 111 of the image ID "I2." Furthermore, in the example of the history data 113, the time when the image data 111 of "I1" is captured is denoted by "T1." The mesh region of each image data 111 is identified by a region ID each denoted by "A1" to "A6" and so on.

For example, the history data 113 of FIG. 5 shows that the identification level of the mesh region of "A4" has changed as follows: "2", "3", "3", "4", "5", "0", "1." This indicates that, between the timing of "T5" when the identification level reached "5" and the timing of "T6" when the identification level dropped to "0", chips were removed from a predetermined position corresponding to the mesh region of "A4", and therefore, the identification level changed from "5" to "0."

The display processing unit 104 displays a predetermined image data 111 including the image data 111 captured by the imaging unit 12, on a display unit 130, which is a monitor. At this time, for example, the display processing unit 104 may display the image data 111 including mesh regions divided by the mesh division unit 102, as described above with respect to FIG. 4A, on the display unit 130.

Figure 4B:
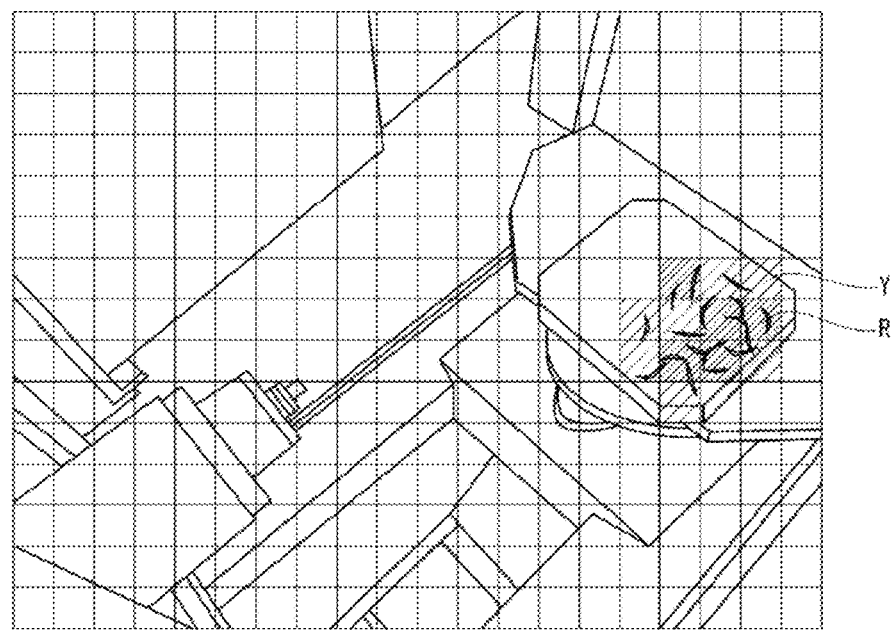
FIG. 4B Another mesh image data generated by the information processing device.

The display processing unit 104 may display the determined value or the identification level of an arbitrary mesh region, using colors, as shown in FIG. 4B, on the display unit 130. For example, red (R) may be displayed in a mesh region with a lot of chips, yellow (Y) may be displayed in a mesh region with a smaller amount of chips than the red region, and no color may be set in an area free of chips, which is displayed with no color (transparent). The color assignment is arbitrary and is not limited to the above. In this way, when the display processing unit 104 displays, using colors, the determined value or the identification level of an arbitrary mesh region of the image data 111 captured by the imaging unit 12, the operator can easily visually recognize the distribution of the chips.

The display unit 130 may display a current real-time image or video of the inside of the machine tool. In this case, the mesh division unit 102 may be configured to divide at least part of the real-time image or video in the machine tool into a plurality of mesh regions. The determined value or the identification level of the mesh regions of the real-time image or video in the machine tool may be displayed using colors.

Furthermore, the display processing unit 104 may display, together with the image data 111, a message that asks for an input of a signal requesting the display of the time-series information on the identification level of a specific mesh region, a message that asks for an input of a signal requesting the ejection of liquid to a predetermined position corresponding to the specific mesh region, and the like, on the display unit 130.

Then, in response to the request for displaying the time-series information, the display processing unit 104 can display the information on the chips in the mesh region corresponding to the predetermined position, on the display unit 130 in time-series order. For example, when a predetermined position is designated and an input signal requesting the display of time-series information is detected by a detection unit 105 as described later, the display processing unit 104 displays the time-series information on the amount of chips in the designated predetermined position, as shown in FIG. 6, on the display unit 130.

The "time-series information" is information showing changes in the "identification level" in time-series order. For example, FIG. 6 illustrates an example in which a mesh region A147 corresponding to a predetermined position is selected on a display screen W including an image data I1. In this case, for example, as illustrated in FIG. 6, a graph of the chip amount is pop-up displayed as a time-series information w1 of the amount of chips at a predetermined position corresponding to the mesh region A147. In the graph of the time-series information w1, the horizontal axis represents the "time", and the vertical axis represents the "identification level." From the time-series information w1 displayed in this way, the operator can grasp the time-series changes at the predetermined position corresponding to each of the mesh regions. The request for displaying the time-series information may be made with respect to the mesh region group constituted of a plurality of mesh regions. In this case, a graph of the amount of chips may be pop-up displayed, as the time-series information w1 of the total amount of chips at a predetermined position corresponding to the mesh region group or the average amount of the chips. From the time-series information w1 displayed in this way, the operator can grasp the time-series changes at a predetermined position corresponding to the mesh region group. It may be configured such that even when the display of the time-series information for one mesh region is requested, like for the mesh region A147, a mesh region group including the one mesh region is automatically set, and the time-series information of the total amount of chips at a predetermined position corresponding to the mesh region group or the average amount of the chips are displayed.

A real-time image or video may be displayed on the display unit 130, and the determined value or the identification level of the mesh region in the real-time image or video image of the inside of the machine tool may be displayed using colors. Displaying a real-time image or the like in a color pattern makes it easy to confirm the region where the chips still remain. It may be configured such that when the operator selects an arbitrary mesh region (or mesh region group) in the real-time image or video of the inside of the machine tool, the time series-information is displayed. When it is confirmed from the time-series information that the amount of accumulated chips has not increased from that at a predetermined time of imaging, the operator can determine that an immediate cleaning of the chips is not necessary in that region. In such a case, a cleaning reservation setting can be made on the operation panel, so that the coolant is ejected after a predetermined period of time, to clean the chips. Then, when the coolant is released after a predetermined period of time and the chips are cleaned, on the real-time image or video, for example, the red mesh region is turned into colorless, from which the operator can easily confirm that the chip has been removed.

The detection unit 105 detects an input signal directed to a predetermined position in the image data 111 displayed on the display unit 130. This input signal is a display request requesting the display of time-series information on the amount of chips in a specific mesh region corresponding to a predetermined position. Alternatively, this input signal is an ejection request requesting the ejection of liquid to the relevant region associated with a predetermined position. For example, the input signal is input by the operator via the input unit 120. The detection unit 105 detects the input signal in association with the mesh region. For example, when having detected the input signal at a position within one mesh region, the detection unit 105 may detect the instructed position as referring to the whole one mesh region.

The detection unit 105 shows a signal corresponding to the input signal on the display processing unit 104 or the ejection control unit 106. Specifically, when detecting a display request as an input signal, in order to display an identification level in a specific mesh region corresponding to a predetermined position specified by this input signal, the detection unit 105 shows information for specifying the predetermined position, on the display processing unit 104. Wen detecting an ejection request as an input signal, in order to eject a liquid to a related region related to a predetermined position specified by this input signal, the detection unit 105 can output information for specifying the predetermined position, on the ejection control unit 106.

The ejection control unit 106 generates a control signal for ejecting liquid so as to move the chips generated from the workpiece, based on the input signal input from the detection unit 105. The ejection control unit 106 outputs the generated control signal to the liquid ejection unit 11. The ejection control unit 106 may store the ejection history as an ejection history data, in the storage unit 110.

The information processing device 10 can be realized by one computer or one tablet. The machine tool may incorporate this information processing device. Further, these processes may be realized by a combination of a plurality of computers connected via a network, serving as an information processing system. Also, for example, it may be configured such that all or part of the data stored in the storage unit 110 is stored in an external recording medium connected via a network (not shown), and the information processing device 10 and the information processing system operate using data stored in the external recording medium.

<Liquid Ejection Process>

Figure 7:
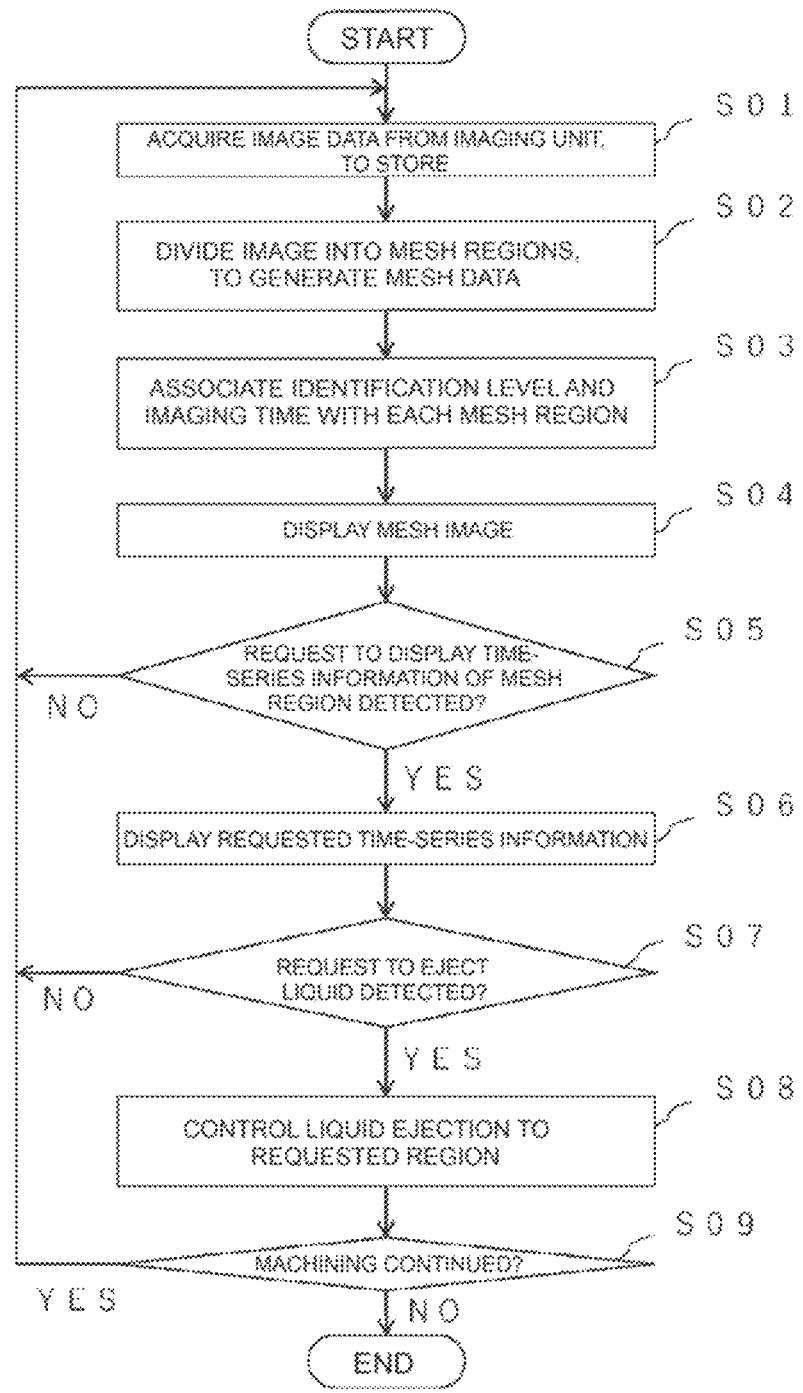
FIG. 7 A flowchart for explaining processing of liquid ejection according to Embodiment 1.

The liquid ejection process in the information processing device 10 according to Embodiment 1 will be described below with reference to the flowchart shown in FIG. 7. First, the acquisition unit 101 acquires the image data 111 captured by the imaging unit 12 and stores it in the storage unit 110 (S01).

The mesh division unit 102 reads out the image data 111 stored in the storage unit 110 and divides it into a plurality of mesh regions, to generate the mesh data 112 (S02).

The information processing unit 103 associates an identification level serving as the information on chips, with each mesh region of the mesh data 112 generated by the mesh division unit 102. The information processing unit 103 further associates the information for specifying the imaging time of the image data 111, and stores it as the history data 113, in the storage unit 110 (S03).

The display processing unit 104 displays the image data 111 including the mesh regions, on the display unit 130 (S04).

When the detection unit 105 detects a display request which is an input signal corresponding to a specific mesh region (YES in S05), the display processing unit 104 displays time-series information of a mesh region specified by the detected input signal, on the display unit 130 (S06).

When the detection unit 105 detects an ejection request which is an input signal, in response to the display of the time-series information in the step S06 (YES in S07), the ejection control unit 106 outputs a control signal for moving the chips at a predetermined position corresponding to the mesh region specified by the detected input signal, to the liquid ejection unit 11 (S08). In response thereto, the liquid ejection unit 11 ejects a liquid for moving the chips.

Thereafter, when the machining in the machine tool 1 is completed (NO in S09), the process ends. On the other hand, when the machining in the machine tool 1 is to be continued (YES in S09), in the information processing device 10, the process returns to the step S01, and the steps S01 to S09 are repeated. Likewise, when no signal is detected by the detection unit 105 (NO in S05 or NO in S07), too, in the information processing device 10, the process returns to the step S01, and the steps are repeated similarly. In the information processing device 10, when the machining in the machine tool is completed during one of the steps, the liquid ejection process can be ended at that step.

As described above, according to the machine tool 1 and the information processing device 10 of the embodiment, the amount of accumulated chips in each mesh region can be managed not only as information at a certain point of time but also as time-series information. Therefore, the accumulation condition of chips can be grasped appropriately, and thus, the chips can be easily removed.

Specifically, according to the information processing device 10, it is possible to grasp the amount of accumulated chips in the mesh image at a certain moment, but also grasp the amount of accumulated chips in time-series order. This makes it possible to identify a region, for example, where the chips are constantly left unremoved although their accumulation at an instant moment is not so large, and the chips tend to accumulate. Thus, the machine tool 1 can remove the chips more accurately. Furthermore, according to the information processing device 10, it is possible to display time-series data of the determined value in a mesh region selected by the operator via the touch screen. Therefore, the operator can easily and accurately grasp the accumulation condition of chips. Moreover, according to the information processing device 10, it is possible to execute the chip removal process manually by the operator, based on the notified information. Therefore, in the machine tool 1, a quick chip removal adapted for the situation can be realized.

Embodiment 2

<Information Processing Device>

Figure 8:
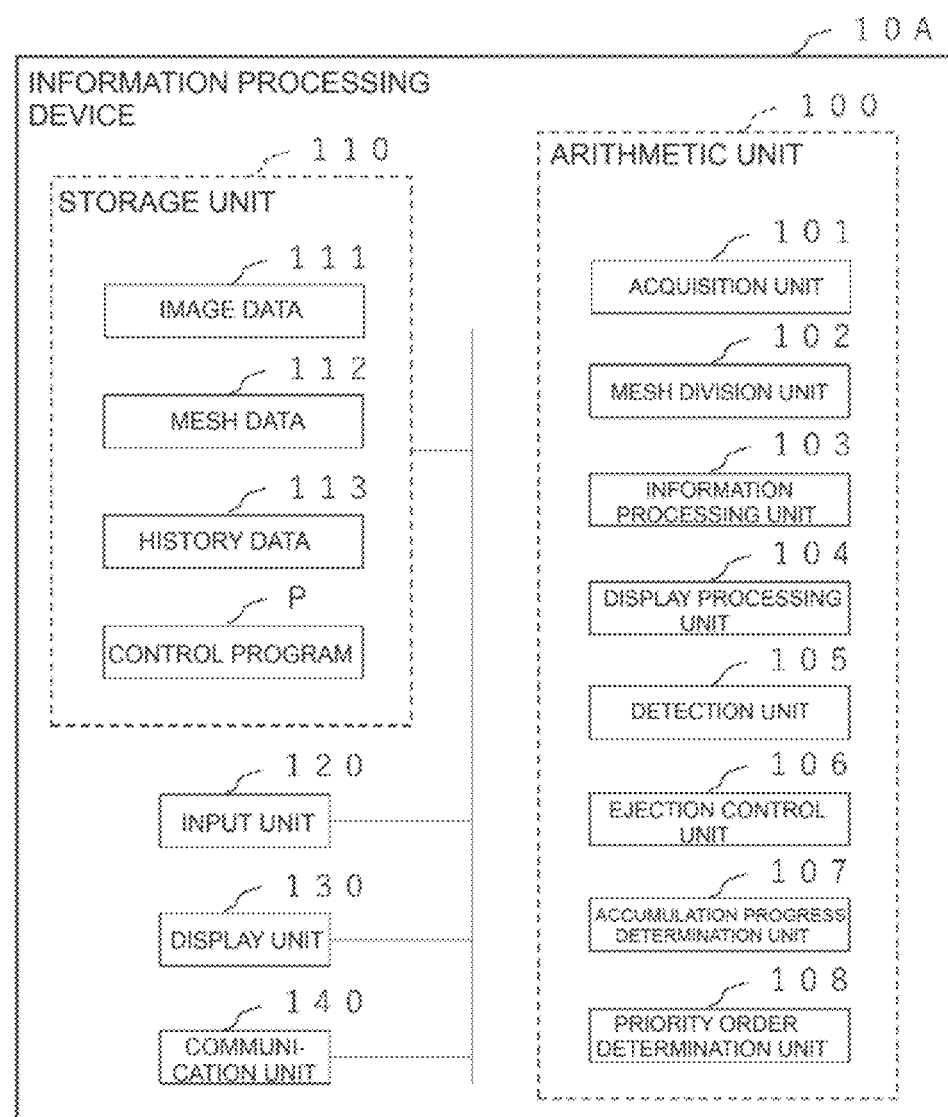
FIG. 8 A block diagram showing a configuration of an information processing device according to Embodiment 2.

A machine tool according to Embodiment 2 has the same configuration as the machine tool 1 described above with reference to FIG. 1, but is different in the configuration of the information processing device from that described above with reference to FIG. 3, and therefore, will be described below with reference to FIGS. 1 and 8. As shown in FIG. 8, an information processing device 10A of the machine tool 1 according to Embodiment 2, as compared with that of the machine tool 1 described above with reference to FIG. 3, is different in including an accumulation progress determination unit 107 and a priority order determination unit 108.

The accumulation progress determination unit 107 detects a mesh region where a predetermined range (predetermined amount) of chips have continued to be present for a predetermined period of time (e.g., 30 min or longer), based on the determined value. Specifically, the mesh region in which the determined value is within the range of preset first and second thresholds (e.g., identification level 5 or less and identification level 2 or more) is referred to as an "accumulation region." The first threshold and the second threshold are set to a value representing a relatively small amount of accumulated chips, which is not usually set as the identification level that requires cleaning, but even within this range, may affect a later cleaning if accumulation continues for a long period of time. The accumulation progress determination unit 107, in order to display a notification notifying that the accumulation region has been detected, can display information for specifying the mesh region determined as the accumulation region, on the display processing unit 104.

The display processing unit 104 notifies the mesh region detected by the accumulation progress determination unit 107, and displays information on chips corresponding to the mesh region, on the display unit 130.

Figure 9:
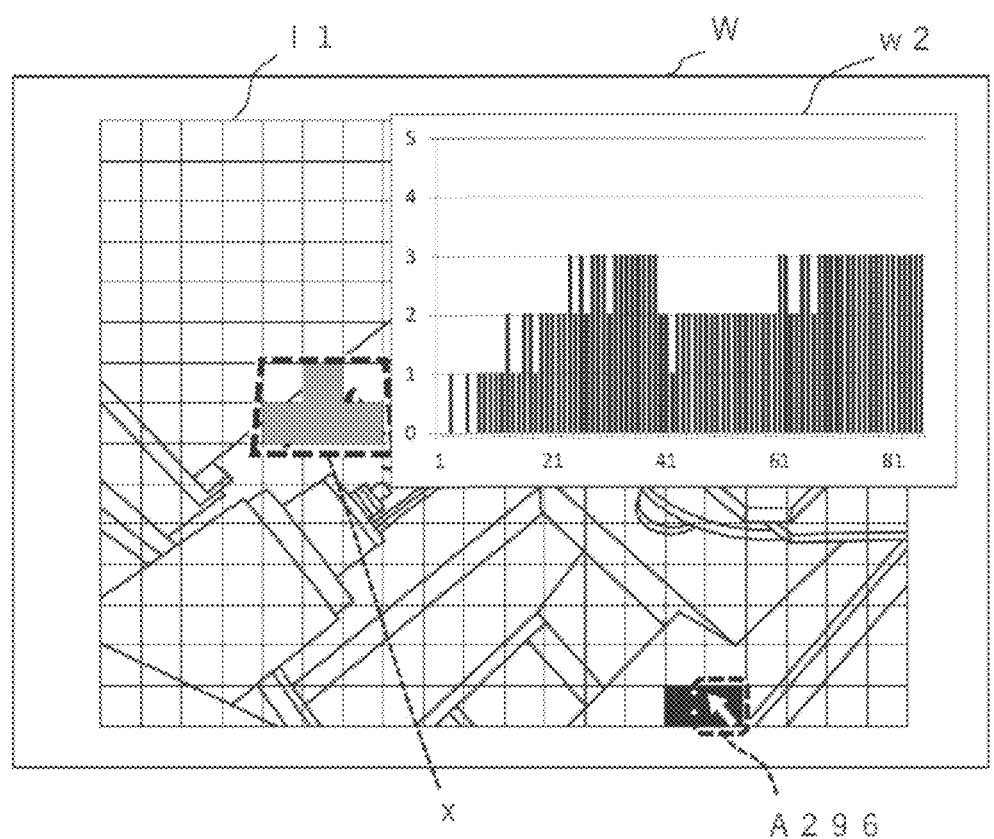
FIG. 9 An example of the display of an accumulation region in the information processing device.

For example, as shown in FIG. 9, the display processing unit 104 may be configured to notify the accumulation area by displaying it in red or other colors (black in FIG. 9) on the display screen W, so as to be distinguished from other mesh regions. Furthermore, as shown in FIG. 9, the display processing unit 104 may be configured to pop-up display time-series information w2 of a mesh region A296 selected in the accumulation region. By doing so, the operator can determine a predetermined region to which a liquid needs to be ejected, and input a request for ejecting the liquid.

For example, the history data 113 of FIG. 5 shows that the identification level of the mesh region of "A3" has changed as follows: "2", "2", "2", "2", "2", "2", "0". This indicates that since the identification level "2" had continued for a predetermined period of time, the liquid was ejected, resulting in the change from "2" to "0."

The display processing unit 104 may display, in addition to the accumulation region, a mesh region (x in FIG. 9) corresponding to the predetermined region to which the liquid has been frequently ejected, using a color different from that of the accumulation region. For example, when the ejection history data is stored in the storage unit 110, the display processing unit 104 can use the ejection history, to display a mesh region to which the liquid has been ejected a predetermined number of times or more, in a certain period of time, on the display unit 130, using a color different from that of the accumulation region.

The priority order determination unit 108 assigns the order of priority of the mesh regions to which the liquid is to be ejected so as to move the chips generated from the workpiece. The priority order determination unit 108, in principle, assigns a high priority to the mesh region where the amount of accumulated chips is large. At this time, the priority order determination unit 108 can perform processing to raise the priority of ejecting the liquid, with respect to at least some of the mesh regions detected by the accumulation progress determination unit 107. Furthermore, in a specific mesh region, an event occurs repeatedly where a predetermined range of chips continue to be present, a high priority can be assigned in advance to that mesh region.

<Liquid Ejection Process>

Figure 10:
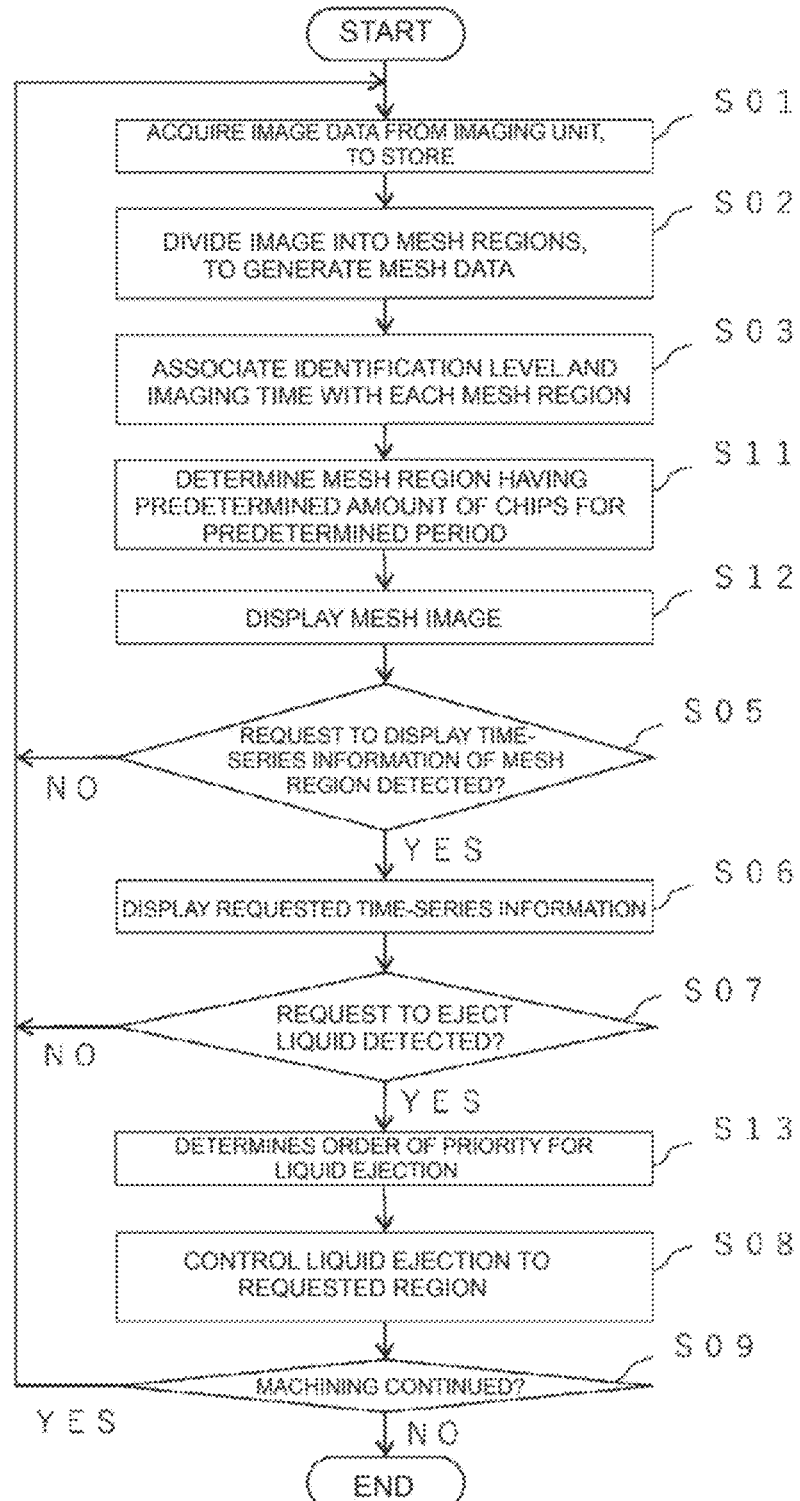
FIG. 10 A flowchart for explaining processing of liquid ejection according to Embodiment 2.

The liquid ejection process of the information processing device 10A according to Embodiment 2 will be described with reference to the flowchart shown in FIG. 10. In the flowchart of FIG. 10, the same step as that in the information processing device 10 described above with reference to FIG. 7 is denoted by the same step number. As shown in FIG. 10, the steps different from those in the information processing device 10 are steps S11, S12 and S13.

Upon completion of the association of the identification level with each mesh region by the information processing unit 103 in the step S03, the accumulation progress determination unit 107 determines the presence or absence of the mesh region in which a predetermined range of chips have been present for a predetermined period of time (S11).

The display processing unit 104, when displaying the mesh image, displays data including information on the mesh region determined by the accumulation progress determination unit 107 in the step S11 as a region in which a predetermined range of chips have been present for a predetermined period of time, on the display unit 130 (S12).

Upon detection of a request for requesting the ejection of liquid in the step S07, the priority order determination unit 108 determines the order of priority for ejecting the liquid (S13). As a result, the liquid ejection control signal output by the ejection control unit 106 in the step S08 is generated in the order determined by the priority order determination unit 108 in the step S13.

As described above, the information processing device 10 can use the history data 113, to detect a region in which chips have been left unremoved for a predetermined period of time even though the amount is small. Specifically, according to the information processing device 10, it is possible to identify and notify the mesh region from which the chips have been left unremoved. Therefore, the operator can quickly and accurately remove the chips. Furthermore, according to the information processing device 10, it is possible to raise the priority of performing the chip removal process in the region where the chips have been left unremoved for a predetermined period of time or longer. Therefore, the chips can be effectively removed.

Variation Example 1

In the above, description is given by way of an example in which the information processing device 10 is configured to store the changes in chip accumulation over time as the history data 113 as shown in FIG. 5, but not limited thereto. For example, the information processing unit 103 uses the history data 113 for each machining cycle to analyze a place where the chips tend to accumulate or a timing at which the chips tend to accumulate during machining of the workpiece. The "machining cycle" is a period of time necessary for machining one workpiece from its start to end. The image unit 12 may capture an image of the inside of the machine tool 1 (a machining region defined as a region where the chips are scattered) at a regular timing during the machining cycle. One timing of capturing one image data in this machining cycle is specified by the "time ID" described above with reference to FIG. 5.

(1) For example, the information processing unit 103 determines the sum total of the chips in all mesh regions as a "chip generation amount", for each of the mesh data 112 identified by each time ID. In the example shown in FIG. 5, in the case of the mesh data 112 identified by the time ID "T1", the sum total of the "identification levels" identified by all region IDs (0+0+2+2+3+4+ . . . ) is determined as a "chip generation amount."

(2) Then, the information processing unit 103 determines a region identified by a region ID having a predetermined ratio (e.g., 20%) or more of the "chip generation amount", for each of the time IDs, as a "region with a lot of chips." The information processing unit 103 may simply determine a region identified by a region ID in which the "chip generation amount" reaches or exceeds a predetermined value, for each of the time IDs, as a "region with a lot of chips."

(3) In addition, the information processing unit 103 determines the ratio of the "identification level" at which the amount of chips is regarded as large, for each of the time IDs, and when the ratio is equal to or more than a predetermined ratio (e.g., when the region of the identification level 3 or higher is equal to or more than 20% of the whole regions), determines the timing identified by the time ID, as a "time window in which chips accumulate a lot."

When determining the order of priority for ejecting a liquid, in addition to the amount of accumulated chips in each mesh region determined based on the image data 111 obtained in the current machining cycle, the priority order determination unit 108 uses the "region with a lot of chips" and the "time window in which chips accumulate a lot" determined in this way by the information processing unit 103. That is, the priority order determination unit 108 may raise the priority of the region designated as the "region with a lot of chips", in the machining cycle in which the same workpiece is machined, with this region taken as the region where the chips tends to accumulate. With respect to the time window determined as the "time window in which chips accumulate a lot", the frequency of liquid ejection may be increased, in the machining cycle in which the same workpiece is machined, with this time window taken as the time window in which the chips tends to accumulate. This makes it possible to efficiently remove the chips in consideration of the past history, in addition to the information based on the currently obtained image data 111.

Variation Example 2

Figure 11:
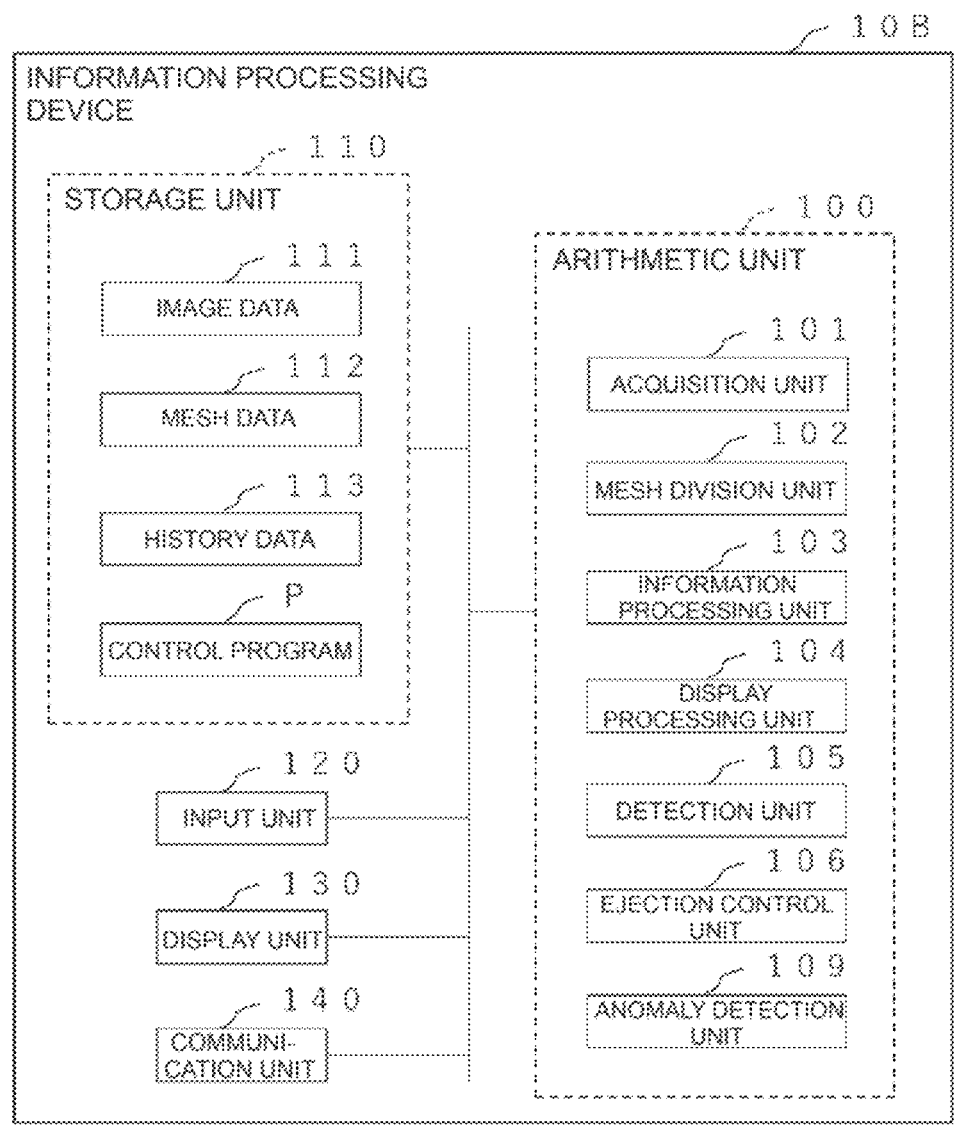
FIG. 11 A block diagram showing a configuration of an information processing device according to Variation Example 2.

An information processing device according to Variation Example 2 is configured to detect a machining anomaly when an anomaly occurs during the machining of a workpiece. For example, as shown in FIG. 11, an information processing device 10B according to Variation Example 2, as compared to the information processing device 10 described above with reference to FIG. 3, is different in including an anomaly detection unit 109 is included. Furthermore, the information processing unit 103 of the information processing device 10B according to Variation Example 2 generates the history data 113 including information on whether or not the workpiece is in each mesh region. In this way, the history data 113 can include, in addition to information on the accumulation condition of chips, information on the condition of a workpiece under machining.

The anomaly detection unit 109 compares the amount of accumulated chips obtained for each mesh region in the image, with the value preset for each mesh region, and outputs an anomaly signal when an anomaly is detected. Specifically, the information processing device 10B can identify from the history data 113, the changes in the amount of accumulated chips in each mesh region in the past during machining. This makes it possible to specify the amount of the chips collected in the machining of each workpiece. Therefore, when the total amount of the chips collected in the current machining cycle deviates from the threshold which has been set based on the statistic amount of the chips obtained from the history data 113, the anomaly detection unit 109 detects it as an anomaly. For example, as compared to the threshold which has been set based on the amount of the chips obtained from the history data 113 in a different machining cycle of the same workpiece, when the amount of the chips in the current machining cycle is determined as large or when determined as small, the anomaly detection unit 109 detects it as an anomaly. Here, an upper limit threshold and a lower limit threshold may be set as the threshold used by the anomaly detection unit 109.

Variation Example 3

An information processing device according to Variation Example 3 is configured to detect at least one of an anomaly having occurred in the liquid ejection unit 11 and an anomaly having occurred in the imaging unit 12. The information processing device according to Variation Example 3 has the same configuration as the information processing device 10B described above with reference to FIG. 12, and will be described with reference to FIG. 11.

The anomaly detection unit 109 of the information processing device 10B according to Variation Example 3 determines whether or not the amount of accumulated chips in a predetermined mesh region has exceeded a threshold, for a predetermined period of time or longer, and outputs a signal when the amount is determined as having exceeded the threshold for the predetermined period of time or longer. Specifically, the anomaly detection unit 109 determines whether or not the amount of chips accumulated in the same mesh region has exceeded a threshold for a predetermined period of time or longer (e.g., 15 min or longer, or 200 or more times of imaging), and displays an alert on the display unit 130 when the amount is determined as having exceeded the threshold for the predetermined period of time or longer. For example, in the machine tool 1, when the amount of accumulated chips in the mesh region corresponding to a certain region has been, for a long period of time, equal to or more than a predetermined amount at which the removal of the chips is preferred, there is a possibility that an anomaly has occurred in the liquid ejection unit 11 or the imaging unit 12. Specifically, in the machine tool 1, when a large amount of chips have continued to accumulate in the same place, there is a possibility that the liquid for moving the chips has not been ejected by the liquid ejection unit 11. Alternatively, there is a possibility that the image data in the machine tool 1 after the moving of the chips has not been captured by the imaging unit 12. Therefore, the anomaly detecting unit 109 detects the continued accumulation at the same place, and also detects whether it is an anomaly having occurred in the liquid ejection unit 11 or an anomaly having occurred in the imaging unit 12. For example, the anomaly detection unit 109 can be configured to display the anomaly detection as an alert on the display unit 130. By doing so, the operator can know the occurrence of an anomaly in the liquid ejection unit 11 or the imaging unit 12.

When the continued accumulation at the same place is detected, the anomaly detection unit 109 detects it as an anomaly in the liquid ejection unit 11 when the value indicating the reliability of the image is within the range of the ideal value. On the other hand, when the value indicating the reliability of the image is out of the range of the ideal value, the anomaly detection unit 109 detects it as an anomaly in the imaging unit 12. The value indicating the reliability of the image is, for example, a frequency for determining the degree of blur, a frequency distribution of the image, a contrast of the image, or the like, and a plurality of these values may be used in combination. In this way, in addition to grasping the accumulation condition of chips, it is possible to realize the detection of an anomaly in the liquid ejection unit 11 and an anomaly in the imaging unit 12.

When the anomaly detection unit 109 detects the continued accumulation, the detection may be done not by detecting the accumulation of the chips in one mesh region for a predetermined period of time but by detecting the accumulation of the chips in a plurality of adjacent mesh regions for a predetermined period of time. It should be noted that the information processing device 10A as described above with reference to FIG. 8 may be configured to additionally include the anomaly detection unit 109 that detects an anomaly having occurred in the liquid discharging unit 11 and the imaging unit 12.

Variation Example 4

Figure 12:
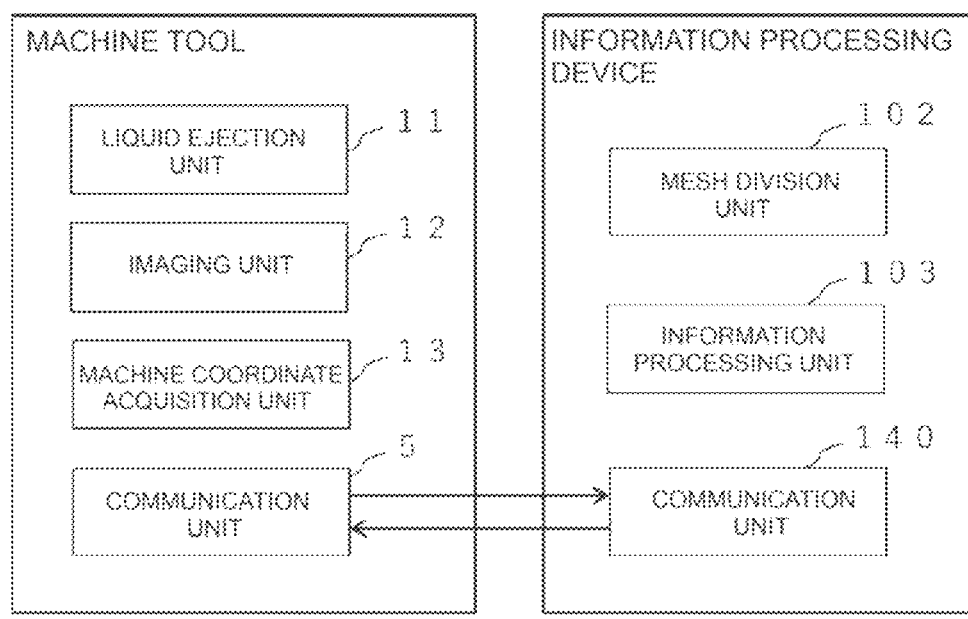
FIG. 12 A block diagram showing a configuration of a machine tool and an information processing device according to Variation Example 4.

In the above description, the information processing device 10 is included in the machine tool 1, but not limited thereto. Specifically, as shown in FIG. 12, the information processing device 10 may not be included in the machine tool 1A, and may be, independent of the machine tool 1A, an external information processing terminal capable of data communication with the machine tool 1A. Although detailed description is omitted in FIG. 12, the configuration of the machine tool 1A is configured similarly to the machine tool 1 as described above with reference to FIGS. 1 and 2, except for including a communication unit 5 and not incorporating the information processing device 10.

Furthermore, in the above description, the image data 111 and the like are displayed on the display unit 130 of the information processing device 10, but not limited thereto. Specifically, the display unit 130 that displays the image data 111 may not be included in the machine tool 1 and the information processing device 10, and may be a monitor of an external information processing terminal or the like capable of data communication with the information processing device 10.

Moreover, in the above description, the detection of the accumulation region is pop-up displayed on the display unit 130 of the information processing device 10, but not limited thereto. Specifically, the information processing device 10 may transmit a message notifying that the accumulation region has been detected, to the information processing terminal owned by the operator or the like. By such a method, the operator can grasp the detection of the accumulation region even when the operator is in a physically separated place from the machine tool 1.

As described above, as an illustration of the technique disclosed in this application, the embodiments have been described. However, the technique in the present disclosure, without limited thereto, can be applied to an embodiment to which modification, replacement, addition, omission, and the like are made as appropriate.

The information processing device, the machine tool and the information processing system recited in all the claims of the present disclosure are realized through collaboration with hardware resources, such as a processor, a memory, and a program.

INDUSTRIAL APPLICABILITY

The information processing device, the machine tool and the information processing system of the present disclosure are useful, for example, for cleaning a machine tool.

REFERENCE SIGNS LIST

1 machine tool
10, 10A information processing device
100 arithmetic unit
101 acquisition unit
102 mesh division unit
103 information processing unit
104 display processing unit
105 detection unit
106 ejection control unit
107 accumulation progress determination unit
108 priority order determination unit

The invention claimed is:

1. An information processing device for displaying an image captured by an imaging unit included in a machine tool, the machine tool including a liquid ejection unit that ejects a liquid so as to move chips generated from a workpiece and the imaging unit that captures an image inside the machine tool, the information processing device comprising:
   a display unit that displays a predetermined image captured by the imaging unit, including an inside image; and
   a detection unit that detects an input signal directed to a predetermined position in the inside image displayed on the display unit; wherein
   the display unit displays, in time-series order, information on chips in a specific mesh region corresponding to the predetermined position among a plurality of mesh regions formed by dividing the inside image in predetermined sizes, based on the input signal.

2. The information processing device according to claim 1, wherein
   the information on chips includes a determined value related to an amount of accumulated chips for each of the mesh regions associated with time, and
   the display unit displays, in time-series order, the determined value corresponding to the specific mesh region.

3. The information processing device according to claim 2, further comprising:
   an accumulation progress determination unit that detects, based on the determined value, the mesh region in which chips continue to be present in an amount within a predetermined range for a predetermined period of time, wherein
   the display unit notifies the mesh region detected by the accumulation progress determination unit, and displays information on chips corresponding to the mesh region.

4. The information processing device according to claim 1, wherein
   the information on chips includes a determined value related to an amount of accumulated chips for each of the mesh regions associated with time, and
   the display unit displays, in time-series order, the determined value corresponding to the specific mesh region.

5. The information processing device according to claim 4, further comprising:
   an accumulation progress determination unit that detects, based on the determined value, the mesh region in which chips continue to be present in an amount within a predetermined range for a predetermined period of time, wherein
   the display unit notifies the mesh region detected by the accumulation progress determination unit, and displays information on chips corresponding to the mesh region.

6. The information processing device according to claim 1, wherein
   the information on chips includes a determined value related to an amount of accumulated chips in a mesh region group composed of a plurality of the mesh regions associated with time, and
   the display unit displays, in time-series order, the determined value corresponding to the mesh region group.

7. The information processing device according to claim 6, further comprising:
   an accumulation progress determination unit that detects, based on the determined value, the mesh region group in which chips continue to be present in an amount within a predetermined range for a predetermined period of time, wherein the display unit notifies the mesh region group detected by the accumulation progress determination unit, and displays information on chips corresponding to the mesh region group.

8. The information processing device according to claim 1, further comprising:
an anomaly detection unit that outputs a signal when detecting a machining anomaly by comparing the mesh region in which a workpiece subjected to machining is included, with a region in which the workpiece is supposed to be present in the machine tool as predicted from a position of each machine coordinate obtained during machining of the workpiece.

9. The information processing device according to claim 1, further comprising:
an anomaly detection unit that determines whether or not an amount of accumulated chips related to a predetermined mesh region has exceeded a threshold for a predetermined period of time or longer, and outputs a signal when the amount of accumulated chips is determined as exceeding the threshold for the predetermined period of time or longer.

10. The information processing device according to claim 1
wherein the liquid ejection unit is controlled based on the input signal.

11. A machine tool, comprising:
the information processing device of claim 1;
a liquid ejection unit that ejects a liquid so as to move chips generated from a workpiece; and
an imaging unit that captures an image inside the machine tool.

12. An information processing device, comprising:
a mesh division unit that divides at least part of first and second images captured at different times of a target area for detecting chips generated from a workpiece, into a plurality of mesh regions, the images each being an inside image of a machine tool; and
an information processing unit that performs processing to associate (a) information on a first chip corresponding to a specific mesh region among the plurality of the mesh regions corresponding to the first image, (b) information on a second chip corresponding to the specific mesh region among the plurality of the mesh regions corresponding to the second image, (c) a first time related to the first image, and (d) a second time related to the second image;
the information processing device including a display unit that displays a predetermined image, wherein
the information on chips includes a determined value related to an amount of accumulated chips in a mesh region group composed of a plurality of the mesh regions associated with time, and
the display unit displays, in time-series order, the determined value corresponding to the mesh region group.

13. The information processing device according to claim 12, further comprising:
an accumulation progress determination unit that detects, based on the determined value, the mesh region group in which chips continue to be present in an amount within a predetermined range for a predetermined period of time, wherein
the display unit notifies the mesh region group detected by the accumulation progress determination unit, and displays information on chips corresponding to the mesh region group.

14. An information processing system, comprising:
a liquid ejection unit that ejects a liquid so as to move chips generated from a workpiece;
an imaging unit that captures an image inside a machine tool, including a region where the workpiece is machined;
a display unit that displays an inside image captured by the imaging unit; and
a detection unit that detects an input signal directed to a predetermined position in the inside image displayed on the display unit, wherein
the display unit displays, in time-series order, information on chips in a corresponding mesh region corresponding to the predetermined position among a plurality of mesh regions formed by dividing the inside image in predetermined sizes, based on the input signal.

* * * * *